Figures 1, 2:
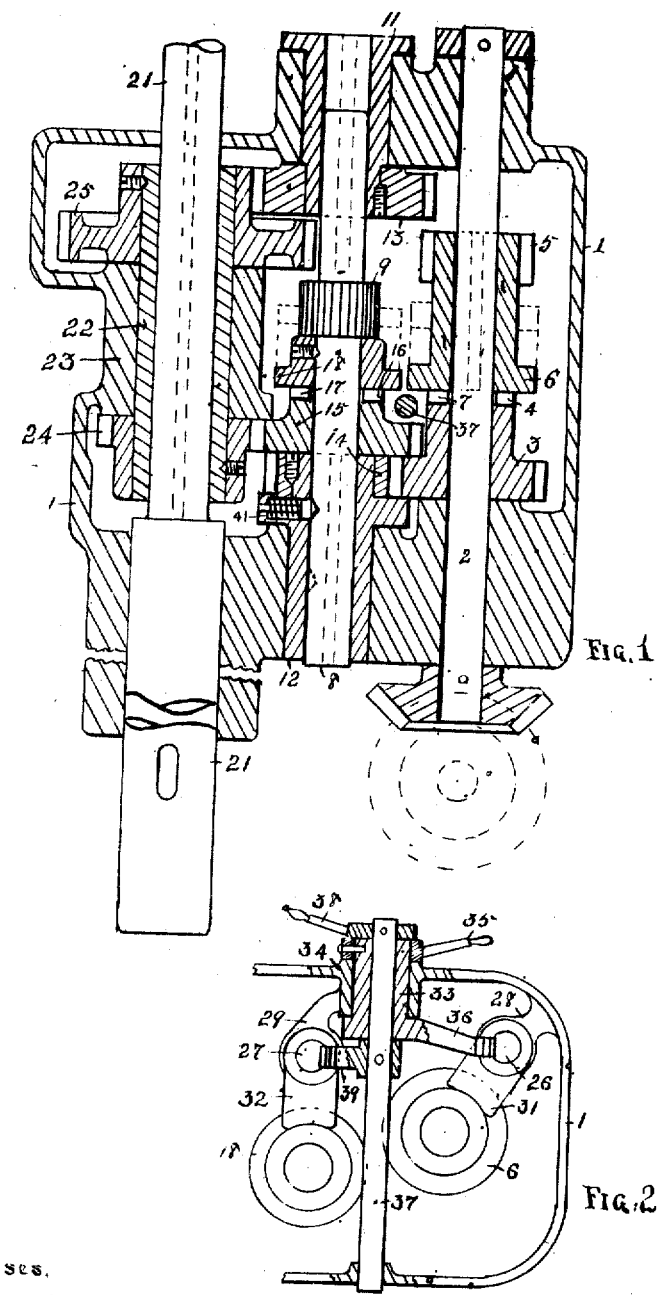

H. M. NORRIS.
GEARING.
APPLICATION FILED SEPT. 1, 1915.

1,204,684.

Patented Nov. 14, 1916.

Witnesses.
P. R. Carr
Samuel S. Carr

Henry McCoy Norris, Inventor.
By Robert S. Carr.
Attorney.

UNITED STATES PATENT OFFICE.

HENRY M. NORRIS, OF CINCINNATI, OHIO, ASSIGNOR TO THE CINCINNATI-BICKFORD TOOL COMPANY, OF CINCINNATI, OHIO, A CORPORATION OF OHIO.

GEARING.

1,204,684.

Specification of Letters Patent.   Patented Nov. 14, 1916.

Application filed September 1, 1915.   Serial No. 48,385.

*To all whom it may concern:*

Be it known that I, HENRY MCCOY NORRIS, a citizen of the United States, residing at Cincinnati, Ohio, have invented a new and useful Improvement in Gearing, of which the following is a specification.

My invention relates to gearing of the class adapted to radial drills or to other suitable purposes, and the objects of my improvements are to provide a plurality of change speed spindle gears for avoiding the excessive speed of the driving pinion on a large spindle gear for obtaining high speed for small drills; to provide a longitudinally movable intermediate shaft for detachably engaging a pinion formed thereon with one of the spindle gears; to provide a graduated succession of change speeds for the spindle through gears of small difference in size, and to provide simple and durable construction and assemblage of the co-acting members for securing facility of operation and efficiency of action. These objects may be attained in the following described manner, as illustrated in the accompanying drawings, in which:—

Figure 1 is a sectional diagram of a gearing embodying my improvements, and Fig. 2 a plan with parts in horizontal section showing the shifting connections.

In the drawings, 1 represents the gear box of a radial drill which may be adjustably mounted on the radial arm (not shown) in the usual manner; 2 the driving shaft provided with the loose gear 3 formed with a clutch member 4. The gear 5 splined on the driving shaft is formed with a collar 6 and with a clutch member 7 for detachably engaging with the corresponding member 4 on gear 3.

The intermediate shaft 8, having the pinion 9 formed thereon, is splined in the sleeves 11 and 12 which are journaled in the walls of the gear box 1. Gear 13 is secured on sleeve 11 and gear 14 is secured on sleeve 12 and in continuous engagement with the loose gear 3. A loose gear 15 on shaft 8 is formed with a clutch member 16 and a coöperating clutch member 17 formed with a collar 18 is secured on said shaft and movable longitudinally therewith. The drill spindle 21 is splined in the sleeve 22 which is journaled in a bearing 23 formed in the wall of the gear box 1. A small gear 24 is secured on one end of the sleeve 22 and in continuous engagement with the loose gear 15 on shaft 8 and a large gear 25 secured on the opposite end of said sleeve is adapted to be detachably engaged by the pinion 9.

Racks 26 and 27 slidably mounted in the respective bearings 28 and 29 are provided with shifting yokes 31 and 32 in movable engagement with the respective collars 6 and 18. A sleeve 33 journaled in a fixed bearing 34 is provided with a hand lever 35 and formed with a segmental gear 36 in engagement with the rack 26 for shifting the gear 5 into or out of engagement with the gear 13 and also the clutch member 7 simultaneously therewith out of or into engagement with the clutch member 4 formed on gear 3.

The shaft 37 journaled in sleeve 33 is provided with a hand lever 38 and also a segmental gear 39 in engagement with the rack 27 for shifting the clutch member 17 with the shaft 8 longitudinally whereby the pinion 9 may be engaged or disengaged with the large spindle gear 25 and the clutch members 16 and 17 simultaneously disengaged or engaged for driving the loose gear 15 with the gear 24 and the spindle.

A spring actuated detent 41 serves to maintain the shaft 8 under a yielding pressure in different predetermined adjustments.

In operation, the size of the gears with their respective number of teeth are so formed that with the shaft 2 driven at a predetermined constant speed and the clutch members 4 and 6 and also 16 and 17 in engagement as shown in Fig. 1, the gear 3 drives the gear 14 with the shaft 8 and the gear 15 drives the spindle gear 24 with the spindle at an approximate ratio to the speed of shaft 2 of 1 to 1. The disengagement of the clutch members 4 and 7 and the engagement of gear 5 with gear 13 drives shaft 8, gear 15, and gear 24 with the spindle at a ratio to the speed of shaft 2 of 1 to 2. The reëngagement of clutch members 4 and 7 and the disengagement of clutch members 16 and 17 and the engagement of pinion 9 with gear 25 serves to drive said gear with the spindle at a speed ratio to that of shaft 2 of 1 to 4.

The disengagement of the clutch members 4 and 7 and also 16 and 17 and the gear 5 in engagement with the gear 13 and the pinion 9 in engagement with the gear 25 serves to drive said gear with the spindle at a ratio of speed in relation to that of shaft 2 of 1 to 8.

By changing the speed of the driving shaft in any well known ordinary manner, a large number of successively graduated speeds of wide range for the spindle may be secured, and without the use of gears of extreme difference in size, thus obviating the objections of driving a large gear with a very small high speed pinion.

Having fully described my improvements, what I claim as my invention and desire to secure by Letters Patent of the United States is:

1. A gearing comprising a support, a driving shaft, a driven shaft provided with a pinion, change speed gear connections between said shafts, a sleeve journaled in the support and provided with gears of different size, a spindle splined in the sleeve, a loose gear on the driven shaft engaging with one of the spindle gears, clutch connections between said loose gear and driven shaft, means for moving the driven shaft longitudinally for alternately engaging said clutch connections, and the pinion on said shaft with the other spindle gear, and means for maintaining the driven shaft under a yielding pressure in different positions of longitudinal adjustment.

2. A gearing comprising a support, two spindle gears arranged to turn in unison, two gears journaled in the support, a driven shaft splined therein and provided with a pinion, a loose gear on said shaft engaging with one of the spindle gears, clutch connections between the driven shaft and the loose gear thereon, means for moving the driven shaft longitudinally for alternately engaging said clutch connections, and the pinion with the other spindle gear, a driving shaft, a loose gear thereon engaging with one of the gears journaled in the support, a gear splined on the driving shaft, clutch connections between said gear and the loose gear on the driving shaft, and means for shifting the splined gear on the driving shaft for alternately engaging with the other gear journaled in the support, and the clutch connections with the loose gear on the driving shaft.

3. A gearing comprising spindle gears of different sizes, a spindle splined therein, a shaft provided with a pinion, a loose gear thereon engaging with one of the spindle gears, clutch connections from the loose gear with the shaft, means for moving the shaft longitudinally for alternately engaging said connections and the pinion with the other spindle gear, and driven change speed gear connections with the shaft.

H. M. NORRIS.

Witnesses:
R. S. CARR,
C. C. SLETE.